United States Patent
Searle et al.

[11] Patent Number: 6,102,272
[45] Date of Patent: Aug. 15, 2000

[54] FRICTIONAL WELDING APPARATUS

[75] Inventors: John Gilbert Searle, deceased, late of Hednesford, by John Patrick Searle, executor; by Stephen Howard Searle, executor, Chesterfield, both of United Kingdom

[73] Assignee: Rolls-Royce PLC, London, United Kingdom

[21] Appl. No.: 09/092,878

[22] Filed: Jun. 8, 1998

[30] Foreign Application Priority Data

Jun. 21, 1997 [GB] United Kingdom .................. 9713068

[51] Int. Cl.[7] ................................................ B23K 20/12
[52] U.S. Cl. .................................... 228/2.1; 228/112.1
[58] Field of Search .......................... 228/112.1, 2.1; 156/73.5

[56] References Cited

U.S. PATENT DOCUMENTS

| | | | |
|---|---|---|---|
| 3,838,807 | 10/1974 | Nomura et al. ............................. | 228/2 |
| 4,905,883 | 3/1990 | Searle ........................................ | 228/2 |
| 4,995,544 | 2/1991 | Searle ........................................ | 228/2 |
| 5,100,044 | 3/1992 | Searle ....................................... | 228/112 |
| 5,248,077 | 9/1993 | Rhoades et al. ...................... | 228/112.1 |
| 5,518,562 | 5/1996 | Searle et al. ............................ | 156/73.8 |
| 5,849,146 | 12/1998 | Searle et al. ............................ | 156/580 |
| 5,853,119 | 12/1998 | Searle ................................... | 228/112.1 |

FOREIGN PATENT DOCUMENTS

| | | |
|---|---|---|
| 0 355 867 B1 | 2/1990 | European Pat. Off. . |
| 2 279 597 | 1/1995 | United Kingdom . |

*Primary Examiner*—Patrick Ryan
*Assistant Examiner*—Kiley Stoner
*Attorney, Agent, or Firm*—Oliff & Berridge, PLC

[57] ABSTRACT

The reciprocally movable parts of a friction welding apparatus for performing a linear bonding process are connected to a rocking member arrangement including a torsion bar arrangement the elastic properties of which are used to store and return energy alternately to the reciprocating system in succeeding half cycles of the linear reciprocal movement. The total work input required from the oscillator driving the welding apparatus, once the system is set in motion, is thus reduced to the work needed to produce the friction bond and to overcome the internal friction of the machine. In a preferred arrangement the reciprocating parts, including the welding tooling, are dynamically balanced by two counterbalance weights spaced symmetrically about a centreline of the apparatus, and each counterweight is coupled through a respective torsion bar mounted rocking member to the reciprocating parts.

11 Claims, 2 Drawing Sheets

FRICTIONAL WELDING APPARATUS

BACKGROUND OF THE INVENTION

Field of the Invention

The invention relates to friction welding apparatus.

In particular the invention concerns a linear friction welding machine. That is a machine for welding together two workpieces which are caused to reciprocate relatively in a rectilinear movement while being pressed together.

As the workpieces are moved one relative to the other while at the same time being pressed together with a substantial force, which may be several tonnes, the forces exerted on and reacted by the workpiece holders are correspondingly massive. It follows that because various reciprocating parts of the apparatus have to be massive to withstand the forces involved a considerable amount of work is done in each cycle of the machine first to accelerate the moving parts, then to decelerate the parts, reverse the direction of movement and to repeat the process. Although a substantial proportion of the work input is converted into heat at the weld joint interface, and some is lost to internal friction, the remainder is expended in cyclically creating and then destroying machine momentum.

SUMMARY OF THE INVENTION

An objective of the present invention is to reduce the total in process work input requirement. Instead of dissipating kinetic energy in the system when workpiece movement is reversed towards opposite ends of the output stroke it is an objective to convert this into potential energy which is returned to the system in the following half cycle in a reverse movement. Consequently after the initial energy input to get the system in motion the prime mover is required to supply only the energy which is converted into heat by frictional rubbing and that required to overcome internal losses in the system.

According to the present invention in its broadest form there is provided friction welding apparatus comprising a reciprocally movable assembly including welding tooling driven by oscillator means, the reciprocally movable assembly being connected to a rocking member on a pivotal mounting having elastic properties whereby energy in the reciprocating parts of the apparatus is alternately stored and released by the elastic pivotal mounting during opposite half-cycles of the reciprocal motion of the welding apparatus.

In a preferred form of the invention there is provided friction welding apparatus wherein a reciprocally movable assembly including welding tooling and a counterbalance mass are interconnected by a coupling arrangement including a rocking member on a pivotal mounting having elastic properties whereby energy in the reciprocating parts of the apparatus is alternately stored and released by the elastic pivotal mounting during opposite half-cycles of the reciprocal motion of the welding apparatus.

The invention and how it may be carried into practice will now be described with reference to an embodiment illustrated in the accompanying drawings, in which:

DETAILED DESCRIPTION OF PREFERRED EMBODIMENTS

Figure 1:
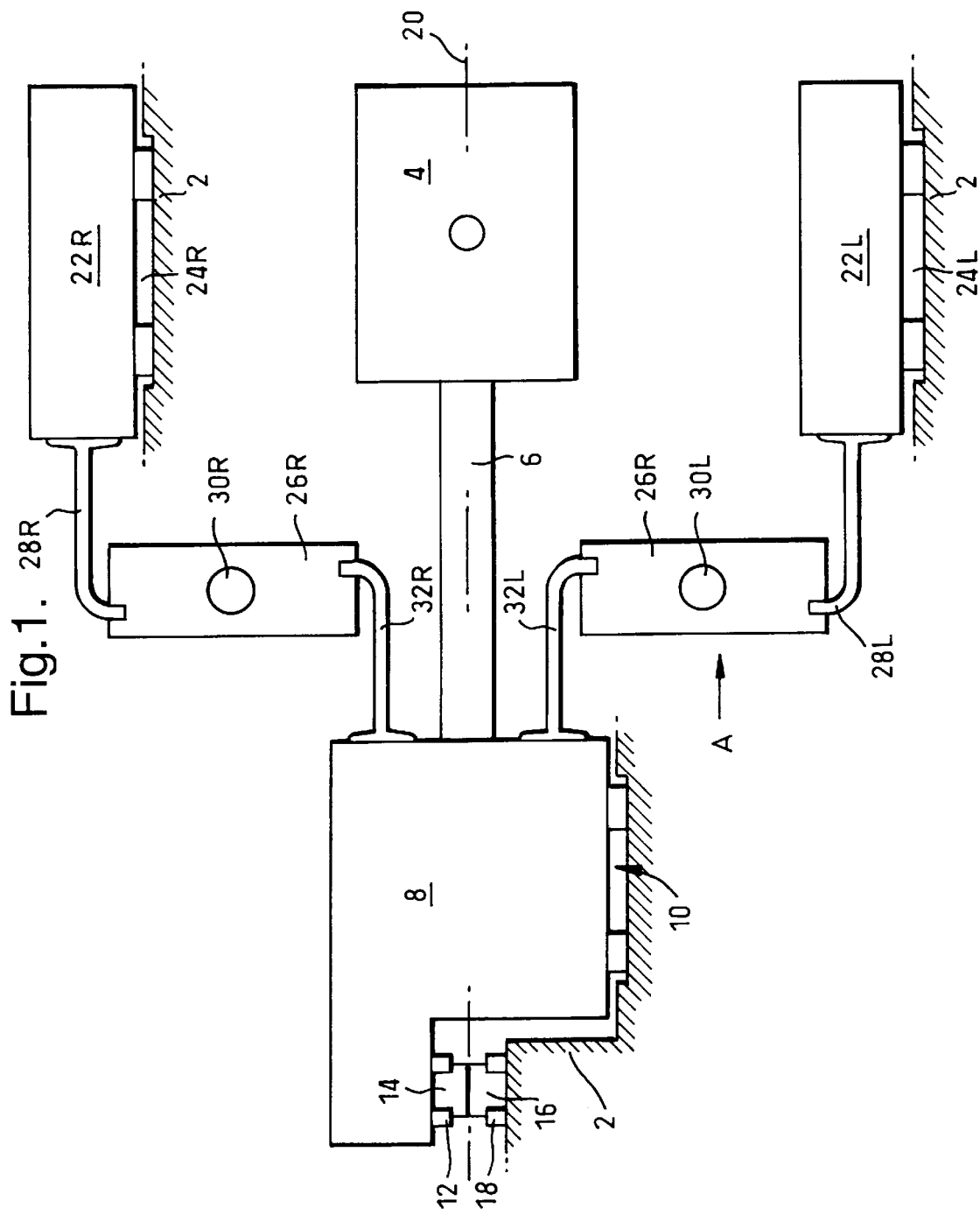
FIG. 1 is a schematic view illustrating the principle of the invention embodied in a linear friction welding machine.

FIG. 1 is a schematic view illustrating a linear friction welder. The apparatus includes a rigid stationary frame portions of which are indicated by reference numerals 2. The moving parts are driven in linear reciprocation by an oscillator 4 through its axially reciprocal output member 6. The detailed internal oscillator mechanism is not of immediate interest and will not be further described herein. Further information on the construction and operation of a suitable oscillator may be had by reference to our earlier published European Patent No 0,355,867 B1. Let it suffice in this description to mention that the oscillator output member 6 is driven in rectilinear, axial reciprocation with sufficient force, amplitude and frequency for the intended purpose. Furthermore, the motion of the member 6 may be brought to rest half way between the end points of its rectilinear reciprocal motion.

The moving parts of the apparatus of FIG. 1 further include a ram unit 8 which is mounted on sliding bearings in a linear guide arrangement, generally indicated at 10, so that it is constrained to move to and fro along a rectilinear path aligned with the axial direction of oscillator output member 6 to which it is drivingly connected. The unit 8 includes gripping jaws 12 (or other suitable component tooling) for holding a component 14 which is to be bonded to a workpiece 16 which is, in turn, held in tooling 18 securely fixed to the frame 2 of the apparatus. Thus, driven by oscillator output member 6 the component 14 is reciprocated linearly relative to the workpiece 16.

A second ram (not shown) is arranged to exert a force perpendicular to the direction of reciprocal movement which urges the component 14 and workpiece 16 one towards the other for the purpose of producing the frictional heating force, during a first phase of a weld cycle, and a weld forge force, during a second phase of the weld cycle. This second ram may be carried by the ram unit 8, in which case the clamping tooling 12 together with the clamped component 14 are mounted so as to be capable of being advanced towards the workpiece 16 and its clamping tooling 18.

The whole apparatus, as will be more evident below, is arranged symmetrically about a centre line, or plane, indicated in FIG. 1 by dashed line 20. It will be noted too that the joint plane of component 14 and workpiece 16 is aligned with centre plane 20 and that the direction of reciprocation also lies in the plane.

It will be apparent already that the moving parts of the welding apparatus described so far possess considerable mass and that the reciprocation of this mass will generate substantial vibration in the apparatus as a whole. Obviously the resulting vibration may be tolerated if the apparatus is sufficiently strong, resilient etc. However, it is preferred to eliminate as much of the vibration as is feasible by providing balancing means for the reciprocating components of the apparatus. Thus it is to be understood that the apparatus shown in the drawings is the currently preferred form of the apparatus but the principles of the present invention embodied therein may carried into practice in other and perhaps less preferred arrangements. Thus, illustrated in FIG. 1 are balancing means for the total mass of the reciprocable output member 6, ram unit 8, tooling 12 and component 14, in the form of reciprocable elements or counter weights $22_R$, $22_L$. These two counterweights $22_R$, $22_L$ are arranged symmetrically and coupled to the main moving parts of the apparatus by coupling means (to be described) which are mirror images of each other and which drive the counterweights in unison so as to eliminate out-of-balance forces. In view of the symmetry of this part of the apparatus, matching pairs of the constituent components are given the same references individually distinguished by subscripts "R" or "L", standing for right and left respectively. No significance is intended by the handed designation, nor should any be read into the allocation, other than what is appropriate to the particular embodiment illustrated The counterweights $22_R$, $22_L$ are mounted for reciprocal movement and are constrained respectively to move to and fro along rectilinear paths $24_R$, $24_L$ aligned with the centreline of the machine and the axial direction of reciprocable driving member 6. Like ram unit 8 the counterweights $22_R$, $22_L$ are supported on bearing means which permit reciprocal sliding movement in the direction of centre plane 20. In the illustration the counterweights $22_R$, $22_L$ are depicted as rectangular blocks with long sides in the direction of sliding motion, but this is not necessarily the case and this shape and orientation is used only for the purposes of illustration and description.

End portions of the sliding counterweights $22_R$, $22_L$ are coupled to end portions of the rockers $26_R$, $26_L$ by flexible blades $28_R$, $28_L$ ends of which are anchored respectively to the weights and the rockers. The rocker beams $26_R$, $26_L$ are pivotally mounted with respect to the apparatus frame at their centres about axes $30_R$, $30_L$ respectively by means to be described in more detail below. The ram unit 8 is also coupled to opposite end portions of the rockers $26_R$, $26_L$ by further flexible blades $32_R$, $32_L$ spaced symmetrically on opposite sides of the centreline 20.

Figure 2:
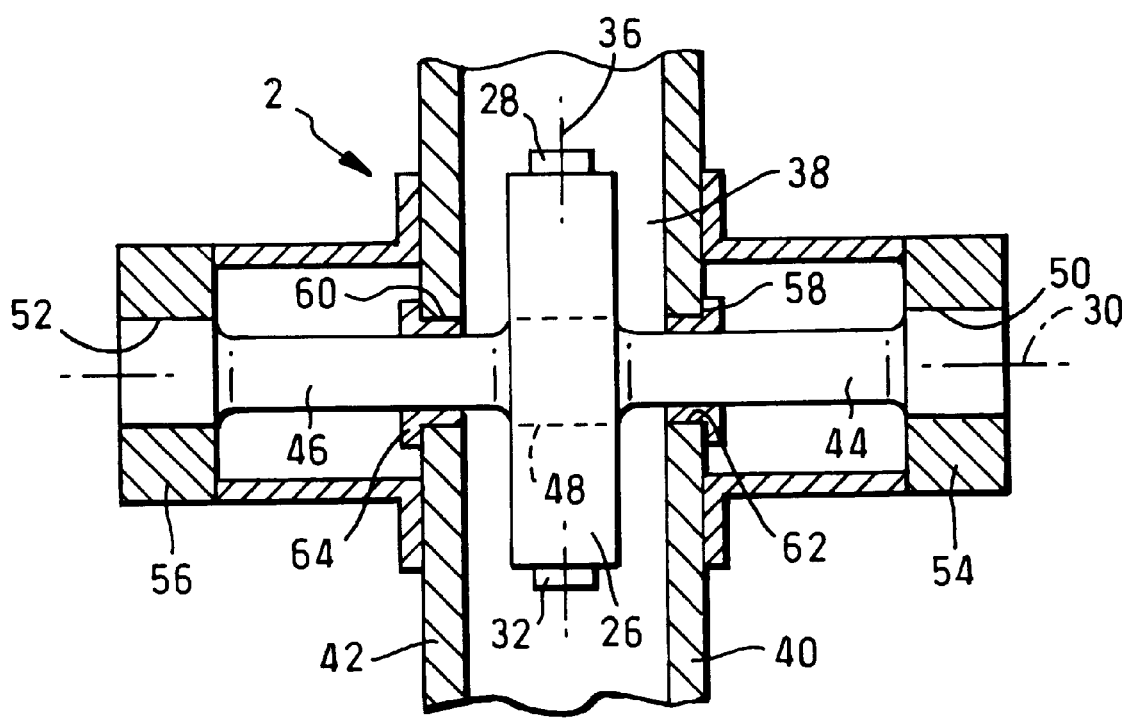
FIG. 2 is a view on Arrow A of FIG. 1 showing in more detail the torsion bar mounting of the rocker beams.

The arrangement of the pivotally mounted rockers is shown in more detail in FIG. 2, in which parts previously references in FIG. 1 carry like references but without the subscripts which indicate handedness. It is to be understood, therefore, that the arrangement of FIG. 2 applies to both rocker beam arrangements shown in FIG. 1.

Referring now to FIG. 2 the rocker beam 26 is mounted for pivotal movement about its centre on axis 30 relative to neighbouring portion of the frame of the apparatus, indicated generally by the reference 2 as previously allotted. The rocker beam 26 is disposed in a plane 36, perpendicular to centreline 30, within a cavity 38 formed in a portion of the apparatus frame 2 by parallel sections 40,42 spaced apart to either side of the plane 36. A pair of torsion bars 44,46 mounted co-axially in end-to-end relationship on centreline 30 carry the rocker beam 26. Inner end portions of these torsion bars engage a correspondingly shaped bore or recess 48 formed in the centre of the rocker beam. In the preferred arrangement the rocker beam 26 is formed in two halves, split along a centre plane (in the plane of the drawing) and each half is formed with a V-groove or notch having an included angle of 90°. When the two halves of the rocker beam 26 are clamped together the V-grooves combine to define a square section hole 48 passing through the rocker beam. The inner ends of the torsion bars 44,46 are formed with correspondingly square-section portions which tightly engage the square section hole 48.

Outer end portions of the torsion bars 44,46 are similarly formed with square-section ends which engage with correspondingly formed square bores 50,52 in stationary members or end caps 54,56 respectively fixed to the apparatus frame 2. In the particular embodiment illustrated the torsion bars pass through apertures 58,60 formed in the parallel frame sections 40,42 concentrically with the centreline and torsion bar axis 30. Journal bearings 62,64 are provided in the apertures 58,60 through which the torsion bars pass, the journals engaging round intermediate portions of the torsion bars for support. They are spaced as close as is convenient to the side faces of the rocker 26 in order to provide best possible support for it. Flexible blades 28,32 are attached to opposite end portions of the rocker 26 remote from the central torsion bar pivotal mounting.

In use, when the oscillator 4 initiates reciprocating movement of the ram unit 8 flexible blade 32 transmits the motion through rocker beam 26 to a balance weight 22. The movement of ram unit 8 and the two balance weights $22_R$, $22_L$ are in perfect synchronism but in anti-phase as a result of which the whole system is in balanced motion. Each rocker beam 26 executes simple harmonic motion about its respective axis 30 supported by the torsion bars 44,46. The rocker beams have a centre position which corresponds to the final position of the component relative to the workpiece, that is to the weld location, and reciprocate about that position. The outermost ends of the torsion bars are securely clamped relative to the apparatus frame 2 therefore the angular momentum of the rocker beam 26, carried by the inner ends of the torsion bars, is absorbed virtually entirely by twisting of the torsion bars. Consequently, when the system is set in motion in each half cycle its kinetic energy due to movement in one direction is converted into potential energy, stored by means of the twist of the torsion bars and returned to the system as movement in the reciprocal direction. However, it will be readily understood by one skilled in this art that the motion is not necessarily simple harmonic motion. Thus, velocity and displacement profiles need not conform to cosine and sine curves although that may be usual and is convenient for descriptive purposes. In general when displacement of the component from the centre position is zero its velocity is maximum, and when the displacement is maximum the velocity is zero and reverses.

The torsion bar arrangement, there may be at least one but more may be employed, acts as a regenerative retarder for the system towards the end of each half cycle of the ram/oscillator stroke. Although it acts to brake the motion of the system it does so by converting kinetic energy into potential energy rather than by dissipating the kinetic energy of the system. The elastic properties of the torsion bars as a temporary energy accumulator for the energy in the system which is returned it to the system in the succeeding half cycle. The torsion bars effectively function as regenerative retarders converting kinetic energy to potential energy and back again with energy losses due to internal friction in the system and energy required in the friction welding process itself.

It will be understood that the action of the torsion bars will confer upon the system a natural frequency at which it will tend to oscillate subject to the damping effect of the energy losses mentioned. The characteristics of the torsion bars such as their torsional stiffness, length, diameter, material, etc affect the natural frequency which therefore may be chosen or tuned to suit system requirements, for example the mass of the system and the welding frequency, by a suitable choice of torsion bar. In the above described arrangement the end caps 54,56 which fixedly secure the outer ends of the torsion bars relative to the frame 2 of the apparatus are arranged to be demountable to allow the torsion bars to be changed.

The torsion bars may be permanently attached to the end caps, in which case they may be changed as a unit, or they may be clamped together. Of course, if the same end cap and fixing is used it effectively limits the axial length of the torsion bar. It may be preferred, therefore, to permit the end cap and its mounting to be demountable to permit replacement by a mounting of greater or lesser height to accommodate a torsion bar of different length.

In another arrangement the rocker beam mounting comprising two torsion bars placed end-to-end may be substituted by a single, double-ended torsion bar, in which the rocker beam is carried in a centre region of the bar and its two extremities are located in opposing fixed end caps. Also where more than one torsion bar is employed they need not all be identical, for example if two torsion bars are used end to end they may have different characteristics although it is not a preferred arrangement.

The provision of counterweight means for balancing the reciprocating mass of the apparatus is not absolutely essential although it is preferred. If the resulting vibration of the apparatus is tolerable the welding apparatus may be constructed lacking any means for cancelling vibrations due to the reciprocating movement, however the principle of using a torsion bar as an energy storage device or regenerative retarder may still be employed. In such an apparatus the reciprocable ram unit 8, including welding tooling 12 etc, is still connected through a flexible blade 32 to a rocking beam 26 which is pivotally mounted on torsion bar 30. The term rocking beam as used in the context of this arrangement is to be understood to include a single-sided beam, or lever, rather than just the double-ended beam of the illustrated arrangement. The torsion arrangement itself may be as described above, although the torsional characteristics of the unit may need to be revised to take into account the reduced mass of the reciprocating parts due to the omission of the balance counterweights.

What is claimed is:

1. Friction welding apparatus comprising a reciprocally movable assembly including welding tooling driven by oscillator means, the reciprocally movable assembly being connected to a rocking member on a pivotal mounting having elastic properties whereby energy in the reciprocating parts of the apparatus is alternately stored and released by the elastic pivotal mounting during opposite half-cycles of the reciprocal motion of the welding apparatus.

2. Friction welding apparatus as claimed in claim 1 wherein a rocking member comprises a member mounted for pivotal movement about an axis perpendicular to the member and passing through a point intermediate its ends.

3. Friction welding apparatus as claimed in claim 1 wherein the elastic pivotal mounting comprises a torsion bar mounting.

4. Friction welding apparatus as claimed in claim 3 wherein the torsion bar mounting comprises at least one torsion bar disposed co-axially with the pivotal axis of a rocking member.

5. Friction welding apparatus as claimed in claim 3 wherein each rocking member is engaged with a mid-section of a torsion bar the ends of which are restrained from pivotal movement relative to the rocking member.

6. Friction welding apparatus as claimed in claim 3 wherein each rocking member is engaged with two torsion bars disposed co-axially with respect to the pivotal axis of the rocking member in end to end relationship and the opposite ends of the torsion bars are restrained from pivotal movement relative to the rocking member.

7. Friction welding apparatus as claimed in claim 3 wherein the or each torsion bar is demountable for replacement by a member of different torsional characteristics.

8. Friction welding apparatus as claimed in claim 1 further comprising a counterbalance mass equal in weight to the mass of the reciprocally movable assembly including welding tooling wherein the reciprocally movable assembly and the counterbalance mass are interconnected by a coupling arrangement including the rocking member on a pivotal mounting having elastic properties whereby energy in the reciprocating parts of the welding apparatus including the counterbalance mass is alternately stored and released by the elastic pivotal mounting during opposite half-cycles of the reciprocal motion of the welding apparatus.

9. Friction welding apparatus as claimed in claim 8 wherein the counterbalance mass comprises two equal counterbalance weights symmetrically disposed about the axis of reciprocation of the welding tooling, each of which is interconnected with the welding tooling by a coupling arrangement including a rocking member.

10. Friction welding apparatus as claimed in claim 9 wherein the coupling arrangement is arranged to pivot the rocking members in opposite directions.

11. Friction welding apparatus as claimed in claim 9 wherein each of the counterbalance weights is coupled to the welding tooling through a respective rocking member, and the rocking members are arranged to pivot in opposite directions about parallel axis disposed symmetrically on either side of the axis of reciprocation of the welding tooling in directions perpendicular thereto.

* * * * *